United States Patent [19]

Haaland

[11] Patent Number: 4,850,603
[45] Date of Patent: Jul. 25, 1989

[54] GASKET FOR SEALING THE GAP BETWEEN TWO ELEMENTS

[76] Inventor: Per Haaland, Kaptein Oppegaards vei 22, N-1152 Oslo 11, Norway

[21] Appl. No.: 57,656

[22] Filed: Jun. 8, 1987

Related U.S. Application Data

[63] Continuation of Ser. No. 816,110, Jan. 3, 1986, abandoned, which is a continuation-in-part of Ser. No. 711,565, Feb. 8, 1985, abandoned.

[51] Int. Cl.$^4$ .............................................. F16J 15/10
[52] U.S. Cl. .................................. 277/207 A; 277/215; 285/230; 285/231; 285/345
[58] Field of Search ................... 277/1, 34, 34.3, 34.6, 277/168–172, 186, 190, 205, 206 R, 208–210, 215, 207 A, 207 R, 226; 251/214, 306; 285/110, 230, 231, 345, DIG. 11

[56] References Cited

U.S. PATENT DOCUMENTS

| 3,386,745 | 6/1968 | Hein | 277/168 |
|---|---|---|---|
| 3,498,623 | 3/1970 | Rowe | 277/207 A X |
| 3,510,140 | 5/1970 | Hermann | 277/207 A X |
| 3,520,541 | 7/1970 | Rohani | 277/207 A X |
| 3,575,430 | 4/1971 | Alpine | 277/207 A X |
| 3,980,311 | 9/1976 | Ditcher | 285/231 X |
| 4,170,365 | 10/1979 | Haaland | 277/215 X |
| 4,299,399 | 11/1981 | Haaland | 277/207 A |
| 4,398,732 | 8/1983 | Christiansen | 277/207 A |

FOREIGN PATENT DOCUMENTS

| 682728 | 3/1964 | Canada | 277/207 A |
|---|---|---|---|
| 869434 | 4/1971 | Canada | 285/231 |
| 2138502 | 2/1973 | Fed. Rep. of Germany | 277/207 A |
| 2165801 | 7/1973 | Fed. Rep. of Germany | 285/345 |
| 2900050 | 9/1979 | Fed. Rep. of Germany | 277/207 A |
| 511528 | 8/1939 | United Kingdom | 277/207 A |

Primary Examiner—Robert S. Ward
Attorney, Agent, or Firm—Jeffers, Hoffman & Niewyk

[57] ABSTRACT

An annular gasket of elastic resilient material for sealing the annular gap between a spigot end and a socket end of two pipes, said spigot end and socket having substantially coaxial sealing surfaces. The gasket comprises a main sealing body which, during the assembly of the pipes, non-slidingly engages a first pipe, and a thin-walled further body which defines a closed cavity containing a lubricant. During assembly of the elements, said further body is entrained by the second pipe and rolls between this pipe and the main sealing body. The inner surfaces of the hollow further body are pressed into contact with each other and slide relative to each other. The flattened further body increases the thickness of the gasket by twice the wall thickness of the further body.

10 Claims, 3 Drawing Sheets

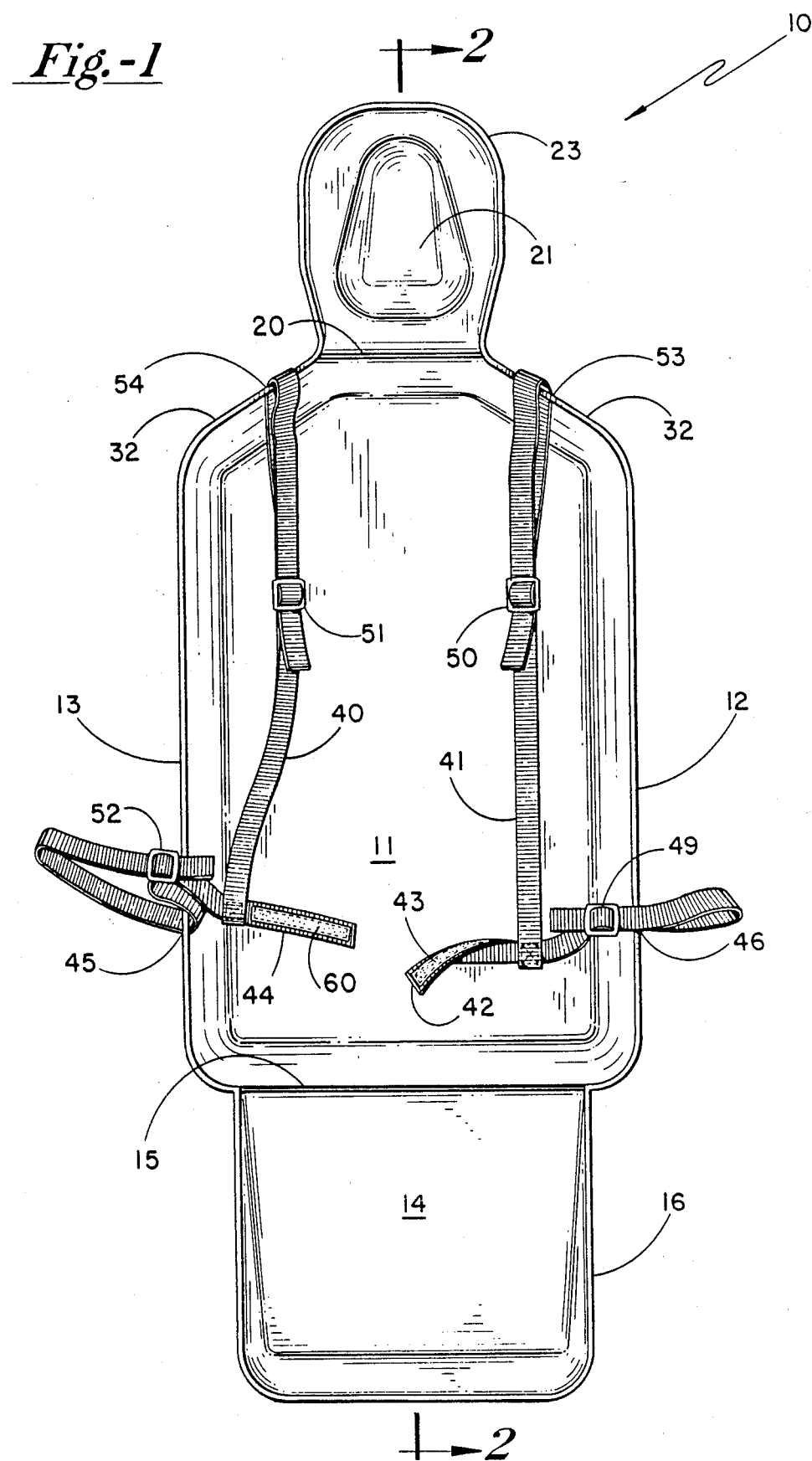

GASKET FOR SEALING THE GAP BETWEEN TWO ELEMENTS

This application is a continuation of application Ser. No. 816,110, filed Jan. 3, 1986, now abandoned, which is a continuation-in-part of Ser. No. 711,565, filed Feb. 8, 1985, now abandoned.

BACKGROUND OF THE INVENTION

1. Field of the Invention

The present invention relates to a sealing means or a gasket strip of elastic resilient material having a uniform cross-section, for sealing the gap between first and second elements having substantially equidistant sealing surfaces, said gasket substantially non-slidingly engaging said sealing surfaces during relative assembly movement of said elements in a direction substantially parallel to the sealing surfaces and perpendicular to the gasket strip whereas portions of the gasket slidingly engage each other to allow the assembly movement, the gasket comprising a main sealing body providing a resilient sealing pressure when deformed and at least one further body connected to the main sealing body and defining a closed cavity containing a lubricant, said further body being formed by walls having a thickness that is small compared with that of the main sealing body and being positioned between said main sealing body and the sealing surface of one of the elements when the elements have been assembled.

2. Prior Art Statement

U.S. Pat. No. 4,299,399 discloses an annular gasket for sealing the annular gap between two assembled tubular elements such as concrete pipes. The gasket includes a main sealing body and a thin-walled jacket which together with the main sealing body defines a closed cavity containing a lubricant. During axial assembly of the two pipes the jacket slides on a sliding surface of the main sealing body and moves beyond the main sealing body to provide a double buffer layer positioned in an axial annular gap between the two pipes axially inside of the main sealing body.

Such a gasket may be provided in a groove in the socket end or the spigot end of each length of pipe. However, this complicates the molding of the pipes. Concrete pipes may be molded in an upright position in a mold comprising a mandrel, an outer mold portion and a hat-shaped bottom ring determining the shape of the socket end of the pipe. To allow the bottom ring to be removed after the concrete is cured, it must be slightly conical. If the groove for the gasket is to be provided in the socket, the gasket may be mounted on the bottom ring to determine the shape of the groove. However, for obtaining a compression of the gasket between the substantially coaxial sealing surfaces on the spigot and socket ends, the gasket has to protrude radially from the groove into the opening of the socket. This can be achieved to some extent if the gasket is provided with a rigid hoop, reducing the outer diameter of the gasket and compressing it on the bottom ring. Still, if the compression is large, the mounting of the gasket on the bottom ring will be complicated.

As an additional measure and provided a relatively long assembly movement is acceptable and sufficient gap space is available axially inside the main sealing body of the gasket, the thickness of the gasket can be increased during assembly by increasing the thickness of the jacket wall from the end thereof initially positioned in the gap between the main sealing body and the sealing surface on the spigot end. The long sockets necessary for gradually achieving the increased thickness by this approach, are, however, frequently undesirable. Further, such a gasket requires a high degree of control over the length of the assembly movement.

SUMMARY OF THE INVENTION

An object of the invention is to provide a gasket allowing for a substantially larger increase than previously possible in the thickness of the gasket during assembly.

The present invention provides a gasket in which said further body has a cross-section of closed annular shape and during assembly is entrained by said sealing surface of said one element so as to roll between said sealing surface and the main sealing body, said annular cross-section being flattened therebetween, the inner surfaces of the flattened body sliding relative to each other.

Further objects and features of the invention will appear from the subsequent part of the specification and especially from the claims. However, it should be especially mentioned that the invention is not restricted to gaskets for mounting on a bottom ring of a mold for concrete pipes. Thus, the gasket defined in the claims is also advantageous for subsequent mounting upon the spigot end of a pipe prior to assembly. The gasket can even be used in the assembly of channels instead of annular elements like pipes.

BRIEF DESCRIPTION OF THE DRAWINGS

The invention will be further described in the following in conjunction with the drawing figures which illustrate a conventional gasket as well as embodiments of the gasket according to the present invention.

DETAILED DESCRIPTION OF THE PREFERRED EMBODIMENTS

Figure 1A:
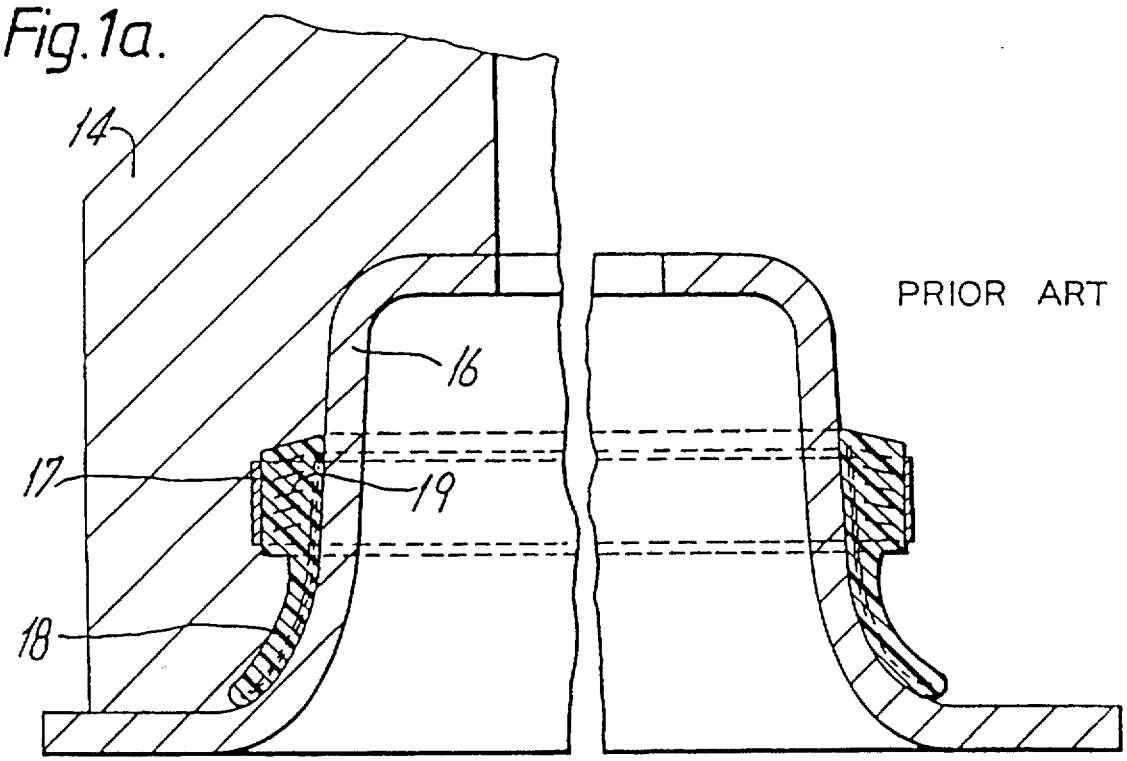
FIGS. 1a and 1b illustrate a known embodiment of an annular gasket according to a previous development leading to the present invention, said gasket being adapted for use on the bottom ring of a mold so as to be positioned in a groove in the socket end of the molded pipe.
Figure 1B:
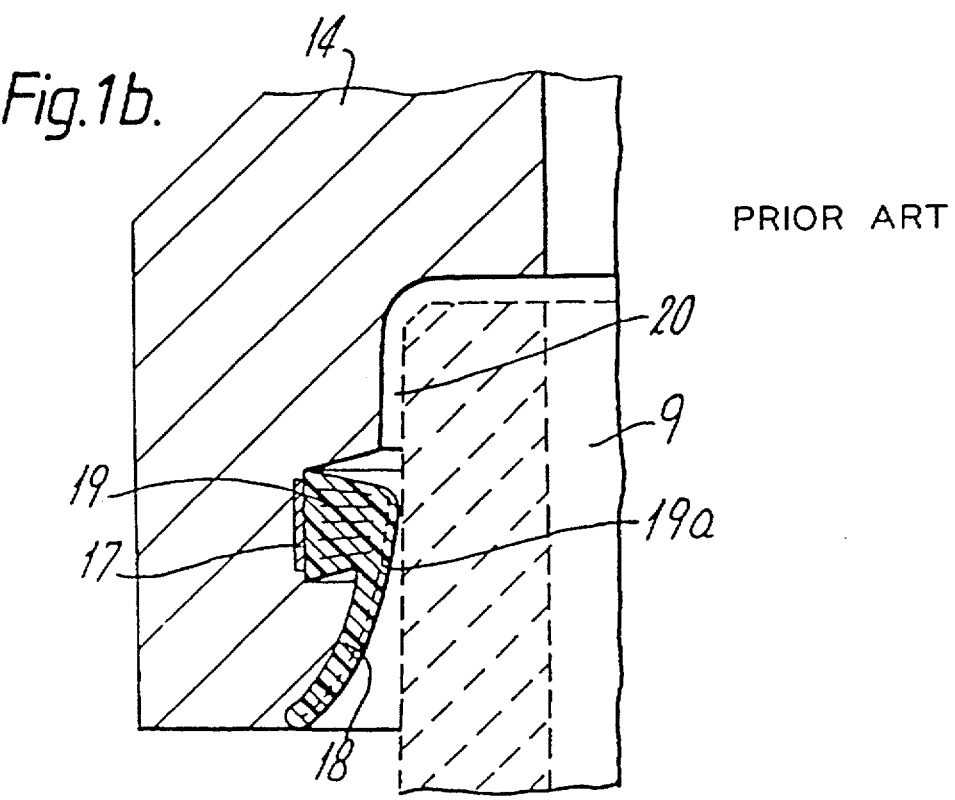
Figure 2:
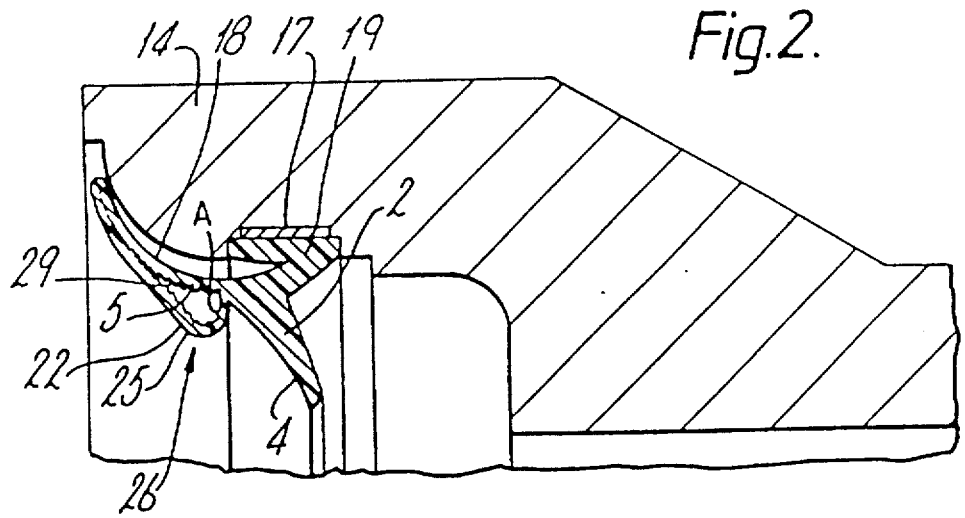
Figure 3:
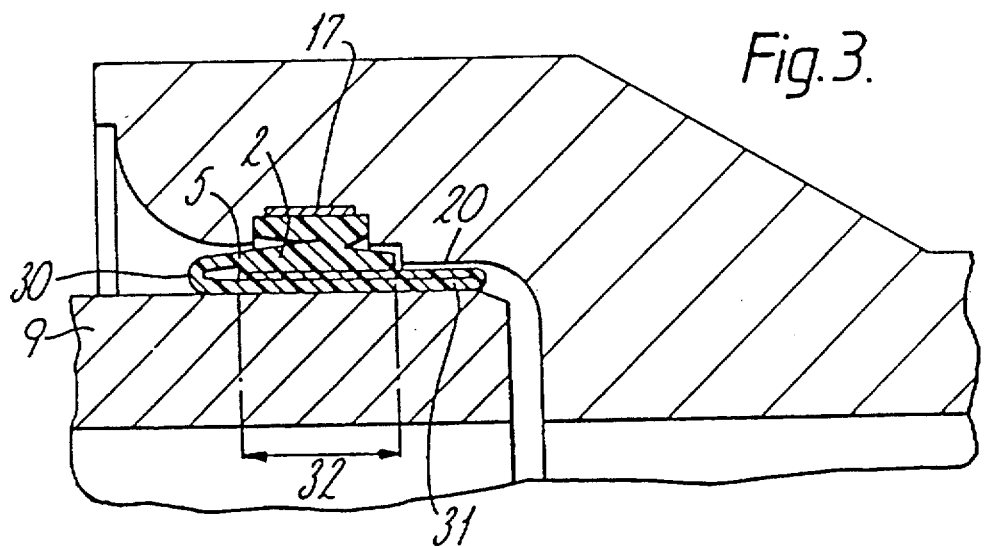

Shown in FIGS. 1a and 1b is a gasket of the general type disclosed in U.S. Pat. No. 4,299,399. The gasket comprises a main sealing body 19 and a jacket 18, and is mounted on a bottom ring 16 constituting a part of a mold for a concrete pipe of which only the lower or socket end 14 is illustrated and with which the gasket is to be used. The gasket is mounted on the bottom ring 16 with the jacket 18 facing the ring. After curing of the concrete the ring 16 is removed from the socket 14, whereby the compression of the gasket is released, the gasket taking a shape which is shown is FIG. 1b and which is suitable for the introduction of a spigot end 9 of another pipe in the socket 14.

To make the gasket protrude into the cavity of the socket when the ring 16 has been removed, it is compressed onto the bottom ring 16. The compression is obtained by means of a non-stretchable hoop 17.

The use of the known sliding type jacket illustrated in FIGS. 1a and 1b requires a lubricant to be supplied to the closed cavity defined by the sliding jacket 18, and such a lubricant to be protected from mixing with sand, earth etc. and from being washed away. During the assembly of the pipe elements 14 and 9, the jacket 18 will slide along the surface 19a of the main sealing body 19 facing the jacket and enter the gap 20 between the pipes axially inside the main sealing body 19, forming therein a double buffer layer preventing contact between the coaxial surfaces of the spigot end and the socket.

Figure 2:
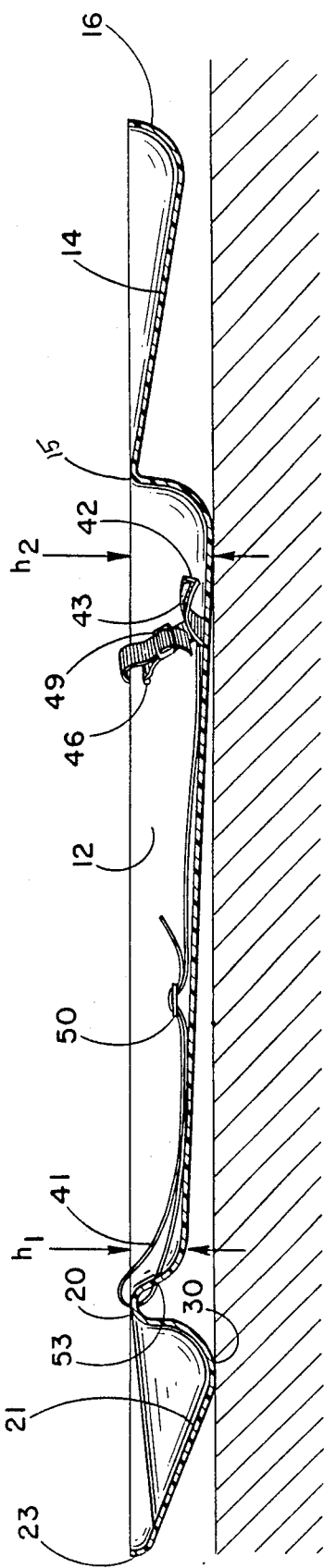
FIGS. 2 and 3 illustrate an embodiment of a gasket according to the present invention, FIG. 2 depicting the gasket in a position prior to the assembly of the elements, and FIG. 3 depicting the gasket after the assembly of the elements.
Figure 3:
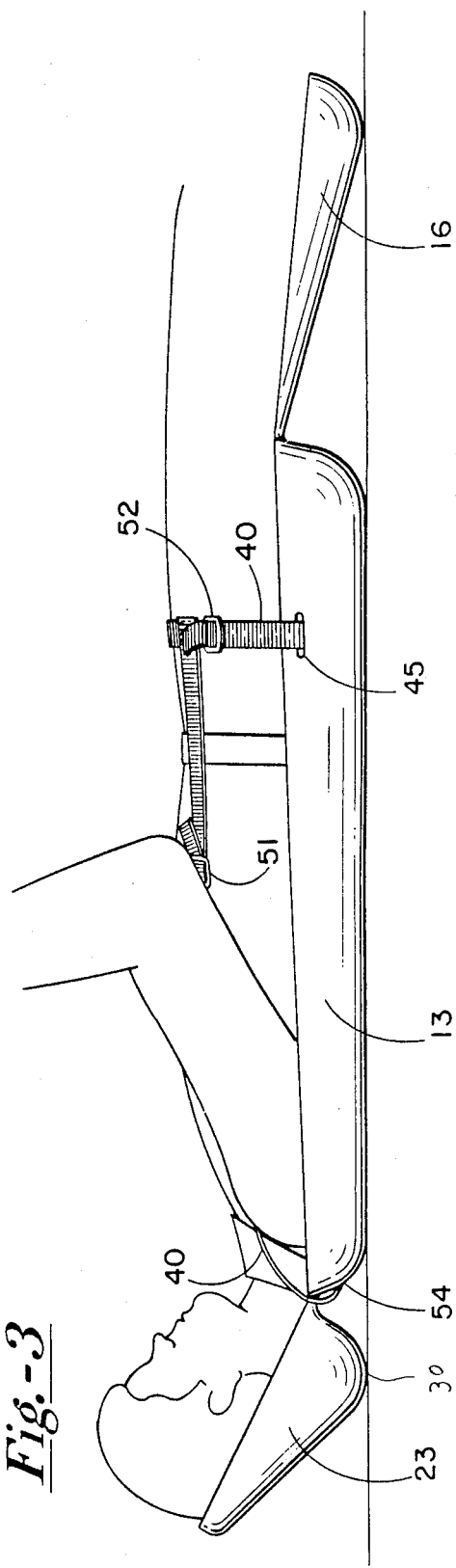
Figure 4:
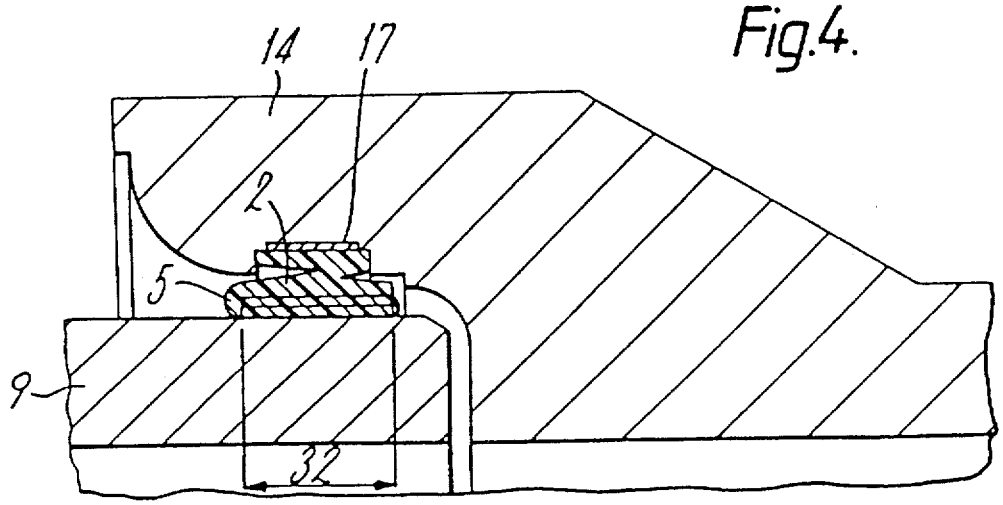
FIG. 4 illustrates a variant of the embodiment according to FIGS. 2 and 3.
Figure 5:
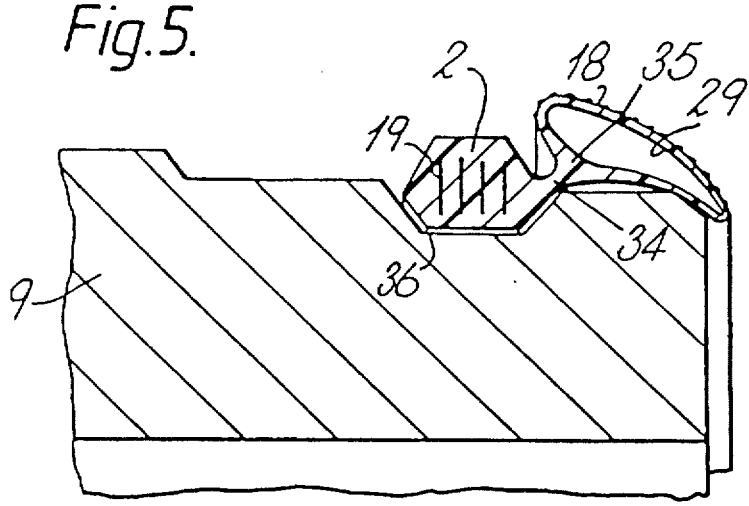
FIGS. 5 and 6 illustrate a further embodiment of the gasket according to the present invention, FIG. 5 depicting the gasket in position prior to the assembly of the elements, and FIG. 6 illustrating the gasket after assembly of the elements.
Figure 6:
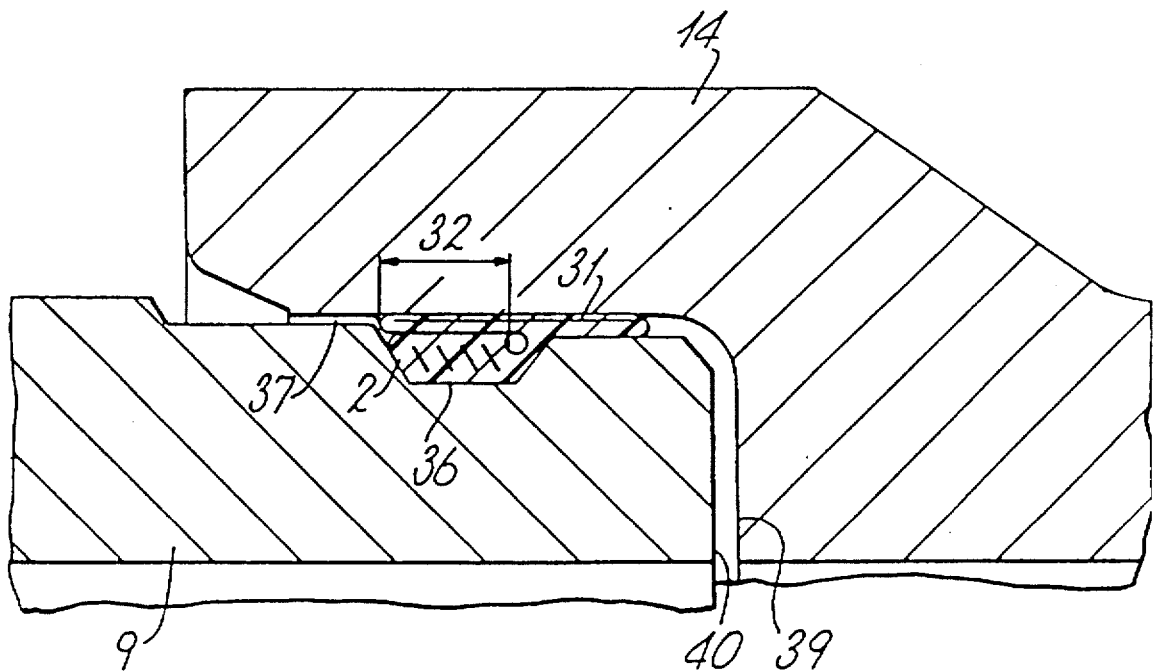

The invention will now be described with reference to FIGS. 2 to 6. FIGS. 2 to 4 illustrate embodiments in which the main sealing body is Z-shaped in cross-section, and FIGS. 5 and 6 illustrate an embodiment in which the cross-section of the main sealing body is lamellae-shaped.

In particular, FIG. 2 illustrates a gasket 2 having a main sealing body 19 of Z-shaped cross-section and a reinforcement hoop or ring 17. The gasket also includes a further body 18 having a cross-section of closed annular shape. The wall of said body has an increasing thickness, the thickest end 5 being connected to the front edge A of the main sealing body 18, similar to what is the case with respect to the gasket shown in FIGS. 1a and 1b. The other end of the wall of said further body 18 is also connected to the front edge A of the main sealing body, closely adjacent to, but radially inside said first end 5, and said other end is shaped so as to bulge inwardly as shown at 25. The smallest diameter 26 of the body 18 is less than the diameter of the spigot end 9 to be inserted in the socket 14. The further body 18 flares forwardly and outwardly towards the socket opening. The inner surfaces of the walls of the body 18 are provided with locking ribs 29 which do not prevent sliding movement corresponding to rolling in of the further body between the sealing surface and the main body, but which do obstruct sliding movement in the opposite direction. The cavity defined by the body 18 contains a certain amount of a suitable lubricant.

When a spigot end 9 (FIGS. 3 and 4) is pushed into the socket 14 and engages said further body 18 at the bulge 25 thereof, said further body 18 will be entrained by the pipe and will follow the movement thereof, while forming a double layer over the main sealing body, the lubricated inner surfaces of the walls of the body 18 sliding along each other. The double layer body will roll into the gap between the pipe 9 and the main sealing body 19, and in fact the body 18 behaves like a caterpillar belt rolling onto the main sealing body 19. The total thickness of the material of the gasket and the compression thereof in the sealing gap between the pipe 9 and the socket 14, will then increase corresponding to two thicknesses of the body 18.

By appropriate selection of the length of the walls of said further body 18 viewed in cross-section and of the length of the assembly movement, buffer layers 30 and 31 can result which extend outside and inside the sealing area 32 defined by the main sealing body 19 as shown in FIG. 3.

In addition, with this embodiment it is possible to avoid such buffer layers, if desirable, by making said walls sufficiently short to prevent the body 18 from rolling beyond the main sealing body 19. The further body 18 will then be positioned only across the sealing width 32, and such a gasket can be used also with pipes providing a too narrow or too short a gap axially inside the main sealing body to accommodate said further body. Such pipes and such gaskets are illustrated in FIG. 4.

Whereas a flattened, hollow, further body performing a rolling movement has been shown, in FIGS. 2-4, in connection with a Z-shaped main sealing body, it should be understood that the invention is not limited to use with this type of main sealing body and can, of course, be used in connection with any appropriate configuration of the main sealing body.

For example, a hollow further body 18 can be used in connection with the type of lamellae gasket which has been discussed with reference to FIGS. 1a and 1b. Again, the inner surfaces of the body 18 will slide relative to each other, a first portion of the body 18 adjacent to the main sealing body being stationary relative to the main sealing body, whereas the distal portion will slide along the first portion, the entire body 18 performing a rolling movement similar to a caterpillar belt rolling into the gap between the main sealing body and one of the pipes.

Although the gasket manufactured according to the present invention is intended for use in connection with pipes or similar objects having substantially coaxial sealing surfaces, the element engaged by the main sealing body 19 does not have to have a strictly cylindrical surface, but may have a groove in which said main sealing body is positioned. In a type of pipe which is widely used, for example in the U.S.A., and which is illustrated in FIGS. 5 and 6, the main sealing body 19 is located in a groove 36, and the gap 37 outside the main sealing body 19 is too narrow to accommodate a double buffer layer 30. Because the rolling body 18 moves with a velocity which is only half the velocity of the socket 14 during the assembly of the elements 9 and 14, the elements can be assembled without the body 18 rolling beyond the sealing portion of the main body 19.

In such a case the length along the circumference of the cross-section of the further body can suitably be made sufficient to leave a substantial part thereof, after the assembly of the elements, ahead of the main sealing body to constitute a buffer layer 31 preventing contact between the elements when subjected to transverse forces.

The further body 18 may be connected to the main sealing body 19 by a web 34. The portion 35 of the further body 18 adjacent the web 34, can be wedge-shaped as shown in FIG. 5 so as to act as a wedge increasing the thickness of the gasket. This will in fact constitute an effective stop for the assembly movement of the pipes when the portion 35 moves into the gap between main sealing body 19 and the socket 14. This is not shown in FIG. 6 since it requires either a shorter circumference of the cross-section of the further body or a longer assembly movement. The stop effect is especially advantageous when laying concrete pipes according to directions requiring a certain distance between the shoulder 39 of the socket 14 and the end face 40 of the spigot end 9.

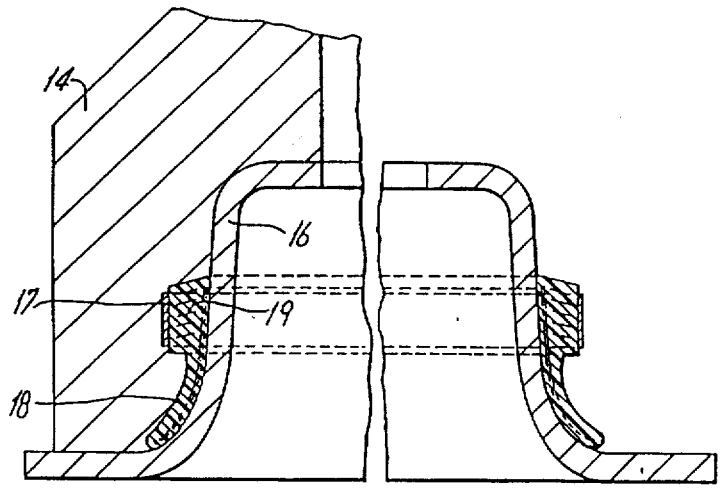

What is claimed is:

1. A gasket strip having a substantially uniform cross-sectional shape and containing elastically resilient material which is adapted for sealing a gap between two elements having sealing surfaces which are substantially uniformly spaced, the gasket comprising a sealing body adapted to be stationary with respect to one of the sealing surfaces during assembly where relative movement of the elements occurs in a direction substantially parallel to the sealing surfaces and transverse to the longitudinal direction of the gasket strip, and a further body which is adapted for substantial non-sliding engagement with the other sealing surface and for movement relative to the sealing body to allow for the assembly movement, said further body having walls defining a closed, empty cavity containing a lubricant and being of reduced thickness compared to the sealing body and wherein as the elements are being assembled, the gasket strip is adapted to have, in the area which is to provide a desired sealing pressure in the assembled position, an increased thickness from the sealing body and from more than one wall of the further body due to the further body, which has an empty cavity, being capable of being flattened with two opposite inner surfaces of said walls contacting each other essentially along their entire length, and being positioned generally in front of said sealing body and adapted to be carried along by the other sealing surface during assembly, such that while being compressed, the further body rolls between this sealing surface and the sealing body in a manner similar to a caterpillar belt.

2. A gasket strip according to claim 1, wherein the further body is connected to the forward end of the sealing body.

3. A gasket strip according to claim 2, wherein the cross-sectional shape of the further body ensures that it will be carried along by a sealing surface during assembly.

4. A gasket strip according to claim 3, whrein the circumference of the cross-section of the further body has a restricted length so as to prevent any substantial part of said further body to roll past said section of the sealing body during assembly of the elements.

5. A gasket strip according to claim 3, wherein the circumference of the cross-section of the further body is of sufficient length either to leave a substantial part of said further body in front of said section of the sealing body when the elements are assembled, or to permit a substantial part of said further body to roll past said section, thereby to form a supporting layer in front of and/or beyond said section, said supporting layer preventing contact between the elements when subjected to transverse forces.

6. A gasket strip according to claim 1, wherein the cross-sectional shape of the further body ensures that it will be carried along by a sealing surface during assembly.

7. A gasket strip according to claim 1, wherein the circumference of the cross-section of the further body has a restricted length so as to prevent any substantial part of said further body to roll past said section of the sealing body during assembly of the elements.

8. A gasket strip according to claim 1, wherein the circumference of the cross-section of the further body is of sufficient length either to leave a substantial part of said further body in front of said section of the sealing body when the elements are assembled, or to permit a substantial part of said further body to roll past said section, thereby to form a supporting layer in front of and/or beyond said section, said supporting layer preventing contact between the elements when subjected to transverse forces.

9. A gasket strip according to claim 1, wherein the strip is annular and has a diameter adapted to fit onto annular, generally coaxial sealing surfaces on two pipe elements.

10. A gasket strip according to claim 9, wherein said pipe elements have a spigot end and a socket end and have an exterior and interior sealing surfaces, respectively.

* * * * *

UNITED STATES PATENT AND TRADEMARK OFFICE
CERTIFICATE OF CORRECTION

PATENT NO. : 4,850,603
DATED : July 25, 1989
INVENTOR(S) : Per Haaland

It is certified that error appears in the above-identified patent and that said Letters Patent is hereby corrected as shown below:

The title page, showing an illustrative figure, should be deleted and substitute therefor the attached title page.

Delete Drawing Sheets 1-2, and substitute therefor the Drawing Sheets, consisting of FIGS. 1-6, as shown on the attached pages.

Column 5, line 38, claim 4, change "whrein" to --wherein--.

Signed and Sealed this

Fourth Day of May, 1999

*Attest:*

Q. TODD DICKINSON

*Attesting Officer*  Acting Commissioner of Patents and Trademarks

United States Patent [19]

Haaland

[11] Patent Number: 4,850,603
[45] Date of Patent: Jul. 25, 1989

[54] GASKET FOR SEALING THE GAP BETWEEN TWO ELEMENTS

[76] Inventor: Per Haaland, Kaptein Oppegaards vei 22, N-1152 Oslo 11, Norway

[21] Appl. No.: 57,656

[22] Filed: Jun. 8, 1987

Related U.S. Application Data

[63] Continuation of Ser. No. 816,110, Jan. 3, 1986, abandoned, which is a continuation-in-part of Ser. No. 711,565, Feb. 8, 1985, abandoned.

[51] Int. Cl.⁴ .................................................. F16J 15/10
[52] U.S. Cl. ................................. 277/207 A; 277/215; 285/230; 285/231; 285/345
[58] Field of Search .............. 277/1, 34, 34.3, 34.6, 277/168–172, 186, 190, 205, 206 R, 208–210, 215, 207 A, 207 R, 226; 251/214, 306; 285/110, 230, 231, 345, DIG. 11

[56] References Cited

U.S. PATENT DOCUMENTS

| 3,386,745 | 6/1968 | Hein | 277/168 |
|---|---|---|---|
| 3,498,623 | 3/1970 | Rowe | 277/207 A X |
| 3,510,140 | 5/1970 | Hermann | 277/207 A X |
| 3,520,541 | 7/1970 | Rohani | 277/207 A X |
| 3,575,430 | 4/1971 | Alpine | 277/207 A X |
| 3,980,311 | 9/1976 | Ditcher | 285/231 X |
| 4,170,365 | 10/1979 | Haaland | 277/215 X |
| 4,299,399 | 11/1981 | Haaland | 277/207 A |
| 4,398,732 | 8/1983 | Christiansen | 277/207 A |

FOREIGN PATENT DOCUMENTS

| 682728 | 3/1964 | Canada | 277/207 A |
|---|---|---|---|
| 869434 | 4/1971 | Canada | 285/231 |
| 2138502 | 2/1973 | Fed. Rep. of Germany | 277/207 A |
| 2165801 | 7/1973 | Fed. Rep. of Germany | 285/345 |
| 2900050 | 9/1979 | Fed. Rep. of Germany | 277/207 A |
| 511528 | 8/1939 | United Kingdom | 277/207 A |

Primary Examiner—Robert S. Ward
Attorney, Agent, or Firm—Jeffers, Hoffman & Niewyk

[57] ABSTRACT

An annular gasket of elastic resilient material for sealing the annular gap between a spigot end and a socket end of two pipes, said spigot end and socket having substantially coaxial sealing surfaces. The gasket comprises a main sealing body which, during the assembly of the pipes, non-slidingly engages a first pipe, and a thin-walled further body which defines a closed cavity containing a lubricant. During assembly of the elements, said further body is entrained by the second pipe and rolls between this pipe and the main sealing body. The inner surfaces of the hollow further body are pressed into contact with each other and slide relative to each other. The flattened further body increases the thickness of the gasket by twice the wall thickness of the further body.

10 Claims, 3 Drawing Sheets